(12) United States Patent
Sugamoto et al.

(10) Patent No.: US 8,231,981 B2
(45) Date of Patent: Jul. 31, 2012

(54) ACRYLIC RESIN, RESIN BOARDS, TRANSPARENT ELECTRODE BOARDS FOR TOUCH PANELS, TOUCH PANELS, AND PROCESSES FOR PRODUCTION OF THEM

(75) Inventors: Hideyuki Sugamoto, Hiroshima (JP); Osamu Kawai, Hiroshima (JP); Hiroki Hatakeyama, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 906 days.

(21) Appl. No.: 12/171,074

(22) Filed: Jul. 10, 2008

(65) Prior Publication Data
US 2008/0278457 A1 Nov. 13, 2008

Related U.S. Application Data

(63) Continuation of application No. 10/534,525, filed as application No. PCT/JP03/14255 on Nov. 10, 2003, now abandoned.

(30) Foreign Application Priority Data

Nov. 11, 2002 (JP) ................................. 2002-326804
Aug. 6, 2003 (JP) ................................. 2003-287820
Aug. 11, 2003 (JP) ................................. 2003-291216

(51) Int. Cl.
*B23B 27/00* (2006.01)
*B23B 27/08* (2006.01)

(52) U.S. Cl. ....................................... 428/500; 428/515
(58) Field of Classification Search ........................ None
See application file for complete search history.

(56) References Cited

U.S. PATENT DOCUMENTS 4,791,184 A * 12/1988 Nagai et al. ................ 526/323.2
5,234,556 A * 8/1993 Oishi et al. ............... 204/157.51

FOREIGN PATENT DOCUMENTS
JP 54-90330 7/1979
* cited by examiner

*Primary Examiner* — Sheeba Ahmed
(74) *Attorney, Agent, or Firm* — Oblon, Spivak, McClelland, Maier & Neustadt, L.L.P.

(57) ABSTRACT

A method of producing an acrylic resin plate, comprising a step of adding 0.001 to 1 part by weight of a polymerization initiator having 10 hours half life temperature of 80° C. or more and 0.015 to 0.2 parts by weight of cyclohexadiene or terpenoid-based compound into 100 parts by weight of a mixture composed of an alkyl methacrylate having a C1-4 alkyl group and a poly-functional (meth)acrylate to give a polymerizable mixture, and a step of polymerizing said polymerizable mixture; an acrylic resin comprising 3 to 30 wt % of an alkyl methacrylate unit having a C8-20 alkyl group, 2 to 35 wt % of a mono-ethylenically unsaturated monomer unit containing an alkyl methacrylate unit having a C1-4 alkyl group and 35 to 95 wt % of a poly-functional (meth)acrylate unit; an acrylic resin plate made of the resin and production process the same, and a transparent electrode plate for touch panel and a touch panel having them.

17 Claims, 2 Drawing Sheets

F I G. 3
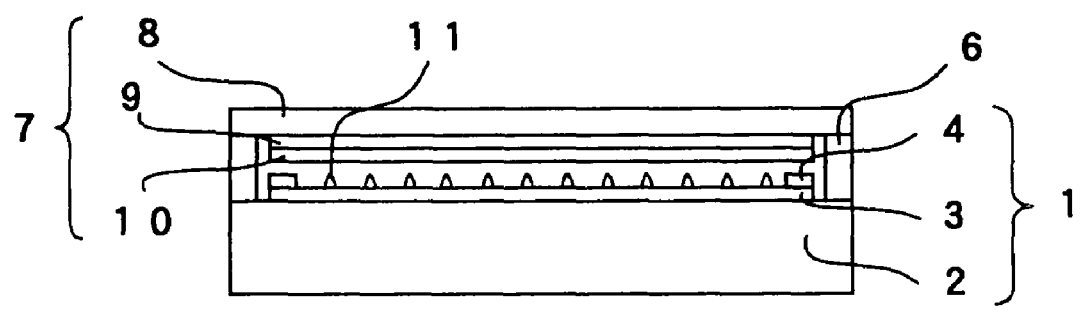

ACRYLIC RESIN, RESIN BOARDS, TRANSPARENT ELECTRODE BOARDS FOR TOUCH PANELS, TOUCH PANELS, AND PROCESSES FOR PRODUCTION OF THEM

TECHNICAL FIELD

The present invention relates to an acrylic resin excellent in heat resistance, appearance and shape stability, a resin plate made of this acrylic resin, a transparent electrode plate for touch panel having a transparent base plate excellent in heat resistance, transparency and electrically conductive membrane close adherence and a touch panel having this transparent electrode plate, and a method of producing the same.

BACKGROUND ART

<Acrylic Resin Plate>

Acrylic resin plates are used for lenses, automobile parts, illumination parts, various electronic displays and the like due to their excellent optical properties. However, acrylic resin plates have a demerit of insufficient heat resistance in the case of effecting heat treatment working at high temperatures.

As a technology of improving the heat resistance of an acrylic resin plate, there is a method of introducing a crosslink structure by adding a poly-functional monomer in polymerization of methyl methacrylate. For example, there is suggested a method in which a poly-functional (meth)acrylate of an alkylene glycol is added to a composition composed of a methyl methacrylate homopolymer and methyl methacrylate, and the mixture is casting-polymerized, for the purpose of improving mainly heat resistance and impact resistance (see, e.g., Japanese Patent Application Publication (JP-B) No. 4-75241). In this method, however, sufficient heat resistance cannot be obtained usually. For obtaining sufficient heat resistance by this method, a poly-functional (meth)acrylate should be added in large amount, and the appearance of the resulting resin molded article tends to deteriorate in this procedure.

Furthermore, there is suggested a method in which at least one of cyclohexadiene and derivatives thereof and terpenoid-based compounds and derivatives thereof is added to methyl methacrylate and a poly-functional (meth)acrylate and the mixture is casting-polymerized, for the purpose of improving heat resistance and appearance (see, e.g., Japanese Patent Application Laid-Open (JP-A) No. 2002-265538). In this method, however, sufficient heat resistance cannot be obtained usually. Additionally, the resulted resin plate is a resin plate liable to absorb moisture.

Furthermore, for the purpose of improving heat resistance and appearance, there is suggested a method of casting-polymerizing a composition comprising a cross-linking agent and an alkyl methacrylate-based syrup obtained by compounding an alkyl methacrylate monomer and a (meth)acrylate-based cross-linking agent and partially polymerizing this (see, e.g., JP-A No. 63-30510). However, in this method, gelling tends to occur in compounding a cross-linking agent to prepare a syrup.

For the purpose of improving appearance, there is suggested a method of determining a ratio of a cross-linking agent to an alkyl methacrylate-based polymer within a certain range (see, e.g., JP-A No. 61-225207). However, there is no example here in which the amount of a poly-functional monomer is over 20 wt %, and sufficient heat resistance cannot be obtained usually by this method. Furthermore, there is a restriction in composition for obtaining a resin plate having high heat resistance and excellent in appearance, generating a disturbance in industrialization.

Furthermore, there is suggested a method of producing an acrylic resin plate in which a monomer mainly composed of methyl methacrylate and allyl (meth)acrylate are casting-polymerized using at least two radical polymerization initiators having 10 hours half life temperatures of higher than 75° C. and lower than 75° C., the difference thereof being 5° C. or more (see, e.g., JP-A No. 9-25305). However, in this method, there is a tendency that polymerizability of an allyl group is poor and sufficient heat resistance is not obtained.

Still further, there is suggested a method of producing an optical material which is radical-polymerized using as a main component a poly-functional (meth)acrylate having an olefinic group (see, e.g., JP-B No. 4-30410). However, in this method, there is a problem that a plate cracks unless peeling is conducted at high temperatures in a peeling process in production.

<Transparent Electrode Plate for Touch Panel and Touch Panel>

Display integrated type input units having a transparent touch panel placed on a display such as a liquid crystal and cathode ray tube are used as an operation image plane of portable information terminals and cash dispensers in banks and the like since when the display image plane is touched with an input pen or finger, the touch panel acts as an input unit and input operation can be conducted easily. Particularly, analog touch panels of resist membrane mode are used most widely since these can be applied to all operation image planes.

Analog touch panels of resist membrane mode have in general a structure comprising an upper transparent electrode plate and a lower transparent electrode plate wherein the upper and lower transparent electrode plate are a transparent electrode plate having a transparent base plate and a transparent electrically conductive membrane formed on this transparent base plate and the upper and lower transparent electrode plates are placed at an interval so that the transparent electrically conductive membranes face mutually.

When an upper transparent electrode plate of a touch panel having such a structure is pressed with an input pen or finger, the upper transparent electrode plate is deflected and transparent electrically conductive membranes of the upper and lower transparent electrode plate contact mutually at this pressed point. The coordinate of this contact point is detected by measurement of electric resistance and input information is read.

As a transparent electrode plate of such a touch panel, there are generally used those in which a resin plate is used as a transparent base plate in the upper transparent electrode plate and a glass plate or resin plate is used as a transparent base plate in the lower transparent electrode plate and a transparent electrically conductive membrane is formed on the surface of these transparent base plates by a vacuum membrane forming method such as a vacuum vapor deposition method, sputtering method, CVD (chemical vapor deposition) method, and ion plating method.

However, the lower transparent electrode plate having a glass plate used as a transparent base plate has problems that it tends to crack in fabricating or carrying a touch panel or pressing a panel with a pen or hand, decreasing in thickness is difficult, decreasing in weight is difficult, and the like.

On the other hand, when a resin plate is used as a transparent base plate, problems of breakage of a base plate occurring in the case of use of a glass plate as a transparent base plate, and of decreasing in thickness and decreasing in weight can be easily solved. Actually, upper and lower electrode plates having a resin plate used as a transparent base plate are also variously investigated (see, for example, JP-A Nos. 2000-276301, 2001-14951 and 2001-34418). However, transparent base plates using a resin plate made of polyethylene terephthalate and the like disclosed in these patent literatures have insufficient transparency. Additionally, there are problems that due to lack of heat resistance, a base plate tends to thermally deform in forming a transparent electrically conductive membrane on the transparent base plate, and because of low close adherence and insufficient durability of a transparent electrically conductive membrane, the surface of a transparent base plate is required to be further processed, and the like.

Furthermore, there is disclosed a methacrylic resin molding material obtained by polymerizing, as a monomer, methyl methacrylate and neopentyl glycol dimethacrylate which is a poly-functional (meth)acrylate (see, e.g., JP-B No. 5-6570). However, there is utterly no disclosure that this methacrylic resin molding material can be utilized as a transparent base plate of a transparent electrode plate for touch panel, and there is utterly no suggestion what composition is suitable for a transparent electrode plate for touch panel, here. Furthermore, the methacrylic resin molding material described in this patent literature has a polymerization ratio of as low as 4 to 62 wt %, therefore, when this molding material is made into a product, it is necessary to enhance polymerization ratio by processes such as compression molding and extrusion molding. Consequently strain occurs, namely, this material is not suitable for a touch panel.

Even further, there is disclosed a touch panel using a transparent base plate obtained by preparing a photo-hardable composition by adding mercaptan to a monomer mixture containing a specific bis(meth)acrylate in an amount of 90 wt % or more, making the composition into a sheet in a cell, and photo-hardening this sheet (see, e.g., JP-A No. 10-105335). However, this transparent base plate has a problem that it tends to crack in a process of peeling from a cell after polymerization and hardening.

DISCLOSURE OF INVENTION

An object of the present invention is to provide a method of producing an acrylic resin plate showing excellent property of preventing plate cracking in a peeling process in production and excellent in heat resistance. A further object of the present invention is to provide an acrylic resin excellent in heat resistance, appearance and shape stability, and an acrylic resin plate made of this resin. A still further object of the present invention is to provide a transparent electrode plate for touch panel having a resin plate excellent in heat resistance, transparency and thin membrane close adherence, and a touch panel having this transparent electrode plate, and a method of producing the same.

The present invention relates to a method of producing an acrylic resin plate, comprising: a step of adding 0.001 to 1 part by weight of a polymerization initiator having 10 hours half life temperature of 80° C. or more and 0.015 to 0.2 parts by weight of at least one compound selected from the group consisting of cyclohexadiene and derivatives thereof and terpenoid-based compounds and derivatives thereof into 100 parts by weight of a mixture composed of 5 to 65 wt % of a mono-ethylenically unsaturated monomer containing an alkyl methacrylate having an alkyl group of 1 to 4 carbon atoms and 35 to 95 wt % of a poly-functional (meth)acrylate having two or more (meth)acryloyl groups to give a polymerizable mixture, and a step of polymerizing said polymerizable mixture to harden the mixture.

Furthermore, the present invention relates to a method of producing an acrylic resin plate, comprising: a step of adding 0.001 to 1 part by weight of a polymerization initiator having 10 hours half life temperature of 80° C. or more and 0.015 to 0.2 parts by weight of at least one compound selected from the group consisting of cyclohexadiene and derivatives thereof and terpenoid-based compounds and derivatives thereof into 100 parts by weight of a mixture composed of 5 to 65 parts by weight of a syrup consisting of 70 to 99 wt % of a mono-ethylenically unsaturated monomer containing an alkyl methacrylate having an alkyl group of 1 to 4 carbon atoms and 1 to 30 wt % of a (co)polymer composed of a mono-ethylenically unsaturated monomer unit containing an alkyl methacrylate having an alkyl group of 1 to 4 carbon atoms, and 35 to 95 parts by weight of a poly-functional (meth)acrylate having two or more (meth)acryloyl groups, to give a polymerizable mixture, and a step of polymerizing said polymerizable mixture to harden the mixture.

Furthermore, the present invention relates to a method of producing an acrylic resin laminate, comprising a step of forming a transparent electrically conductive membrane on at least one surface of an acrylic resin plate obtained by the above-mentioned production methods.

Furthermore, the present invention relates to a method of producing a transparent electrode plate for touch panel, comprising a step of forming a transparent electrically conductive membrane on at least one surface of an acrylic resin plate obtained by the above-mentioned production methods.

Furthermore, the present invention relates to a method of producing a touch panel having an upper transparent electrode plate and a lower transparent electrode plate, wherein the upper transparent electrode plate and the lower transparent electrode plate are a transparent electrode plate having a transparent base plate and a transparent electrically conductive membrane formed on at least one surface of the transparent base plate and the upper transparent electrode plate and the lower transparent electrode plate are placed at an interval so that the transparent electrically conductive membranes face mutually, and at least one of the upper transparent electrode plate and the lower transparent electrode plate is a transparent electrode plate for touch panel obtained by the above-mentioned production method.

Furthermore, the present invention relates to an acrylic resin comprising 3 to 30 wt % of an alkyl methacrylate unit having an alkyl group of 8 to 20 carbon atoms, 2 to 35 wt % of a mono-ethylenically unsaturated monomer unit containing an alkyl methacrylate unit having an alkyl group of 1 to 4 carbon atoms and 35 to 95 wt % of a poly-functional (meth)acrylate unit having two or more (meth)acryloyl groups.

Furthermore, the present invention relates to a method of producing an acrylic resin plate, comprising polymerizing a polymerizable mixture comprising 3 to 30 wt % of an alkyl methacrylate having an alkyl group of 8 to 20 carbon atoms, 2 to 35 wt % of a mono-ethylenically unsaturated monomer containing an alkyl methacrylate having an alkyl group of 1 to 4 carbon atoms and 35 to 95 wt % of a polyfunctional (meth) acrylate having two or more (meth)acryloyl groups to harden the mixture.

Furthermore, the present invention relates to an acrylic resin laminate obtained by forming a transparent electrically conductive membrane on at least one surface of this acrylic resin plate.

Furthermore, the present invention relates to a transparent electrode plate for touch panel having this acrylic resin laminate.

Furthermore, the present invention relates to a touch panel having an upper transparent electrode plate and a lower transparent electrode plate, wherein the upper transparent electrode plate and the lower transparent electrode plate are a transparent electrode plate having a transparent base plate and a transparent electrically conductive membrane formed on at least one surface of the transparent base plate and the upper transparent electrode plate and the lower transparent electrode plate are placed at an interval so that the transparent electrically conductive membranes face mutually, and at least one of the upper transparent electrode plate and the lower transparent electrode plate is the above-mentioned transparent electrode plate for touch panel.

Since a specific composition is adopted in the method of producing an acrylic resin plate of the present invention, heat resistance, appearance and a property of preventing plate cracking in a peeling process in production further can be improved significantly while maintaining excellent optical properties of an acrylic resin.

Since a specific composition is adopted in the acrylic resin of the present invention and the acrylic resin plate made of this resin, heat resistance, appearance and shape stability further can be improved significantly while maintaining excellent optical properties originally owned by an acrylic resin. Furthermore, an acrylic resin laminated obtained by forming a transparent electrically conductive membrane such as an ITO membrane on this acrylic resin plate is very useful as a transparent electrode plate for touch panel.

The transparent electrode plate for touch panel of the present invention has heat resistance capable of enduring a process of forming an inorganic thin membrane and a process of thermally hardening an electrode and has extremely excellent thin membrane close adherence while maintaining excellent optical properties originally owned by an acrylic resin, consequently, surface treatment of a resin plate is unnecessary. Furthermore, since a resin plate can be used as a base plate of a transparent electrode plate for touch panel, prevention of breakage, decreasing in weight and decreasing in thickness of a touch panel can be made easy, and application to uses and shapes which cannot be attained in conventional glass plate use is made possible.

BRIEF DESCRIPTION OF DRAWINGS

FIG. 3 is a schematic sectional view showing one example of a touch panel in which a transparent electrode plate shown in FIGS. 1 and 2 is used as a lower transparent electrode plate.

BEST MODES FOR CARRYING OUT THE INVENTION

<Acrylic Resin and Resin Plate>

Figure 1:
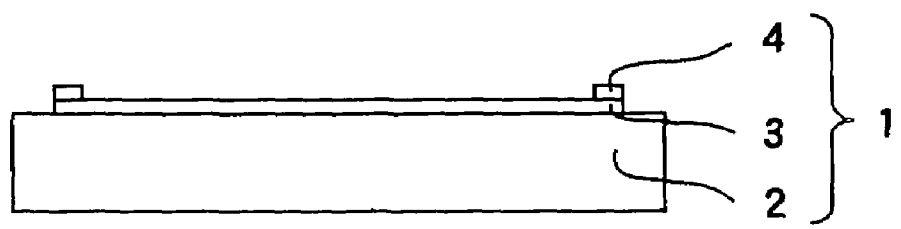
FIG. 1 is a schematic sectional view showing one example of a transparent electrode plate for touch panel of the present invention.

Regarding the method of producing an acrylic resin plate of the present invention, a case of using a mixture composed of a mono-ethylenically unsaturated monomer and a poly-functional (meth)acrylate will be described first.

The mixture in this case is composed of 5 to 65 wt % of a mono-ethylenically unsaturated monomer containing an alkyl methacrylate having an alkyl group of 1 to 4 carbon atoms and 35 to 95 wt % of a poly-functional (meth)acrylate having two or more (meth)acryloyl groups.

The content of the mono-ethylenically unsaturated monomer containing an alkyl methacrylate having an alkyl group of 1 to 4 carbon atoms is 5 to 65 wt % in the mixture. When this content is 5 wt % or more, appearance tends to be improved, and when 65 wt % or less, heat resistance tends to be improved. Furthermore, this content is preferably from 10 to 55 wt %, and more preferably from 15 to 50 wt %. If the total amount of mono-ethylenically unsaturated monomers containing an alkyl methacrylate having an alkyl group of 1 to 4 carbon atoms is 100 parts by weight, the proportion of an alkyl methacrylate having an alkyl group of 1 to 4 carbon atoms is preferably 50 parts by weight or more in imparting high transparency to a resin plate, and the proportion of other mono-ethylenically unsaturated monomers is preferably 50 parts by weight or less. With this proportion, transparency tends to be improved and heat resistance is further improved in some cases.

Examples of the alkyl methacrylate having an alkyl group of 1 to 4 carbon atoms include methyl methacrylate, ethyl methacrylate, n-propyl methacrylate, isopropyl methacrylate, n-butyl methacrylate, i-butyl methacrylate and t-butyl methacryllate. These can be used also in combination. Of them, methyl methacrylate is particularly preferable.

Examples of mono-ethylenically unsaturated monomers other than the alkyl methacrylate having an alkyl group of 1 to 4 carbon atoms include styrene, α-methylstyrene, acrylonitrile, acrylic acid, methacrylic acid, methyl acrylate, ethyl acrylate, n-butyl acrylate, 2-ethylhexyl methacrylate, lauryl methacrylate, tridecyl methacrylate, stearyl methacrylate, isostearyl methacrylate, cyclohexyl methacrylate, benzyl methacrylate, isobornyl methacrylate, glycidyl methacrylate, tetrahydrofurfuryl methacrylate, 2-hydroxyethyl methacrylate, hydroxypropyl methacrylate, methoxyethyl methacrylate and ethoxyethyl methacrylate. They can be used also in combination. For reducing the amount of remaining monomers in the resulting resin plate, it is preferable to use an alkyl acrylate having an alkyl group of 1 to 4 carbon atoms such as methyl acrylate and ethyl acrylate.

The content of the poly-functional (meth)acrylate having two or more (meth)acryloyl groups is 35 to 95 wt % in the mixture. When this content is 35 wt % or more, heat resistance tends to be improved, and when 95 wt % or less, appearance tends to be excellent. This content is preferably from 45 to 90 wt %, and more preferably from 50 to 85 wt %.

The poly-functional (meth)acrylate having two or more (meth)acryloyl groups is a poly-functional acrylate having two or more acryloyl groups or a poly-functional methacrylate having two or more methacryloyl groups. These can be used also in combination. Examples of this poly-functional (meth)acrylate include compounds of the following general formula (1)

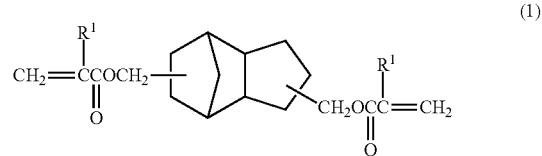

(1)

wherein, $R^1$ represents H or $CH_3$),
compounds of the following general formula (2):

(2)

$$CH_2=\overset{R^2}{\underset{\underset{O}{\|}}{C}}COCH_2-\overset{R^4}{\underset{\underset{R^5}{|}}{(C)_n}}-CH_2O\overset{R^3}{\underset{\underset{O}{\|}}{C}}C=CH_2$$

wherein, $R^2$ and $R^3$ represent H or $CH_3$, $R^4$ and $R^5$ represent H or a hydrocarbon group having 3 or less carbon atoms, and n represents an integer of 0 to 4, trimethylolpropane trimethacrylate, trimethylolpropane triacrylate, pentaerythritol tetramethacrylate, pentaerythritol tetraacrylate, ditrimethylolpropane hexamethacrylate, ditrimethylolpropane hexaacrylate, dipentaerythritol hexamethacrylate and dipentaerythritol hexaacrylate. These can be used also in combination.

Of them, compounds of the general formula (1) or the general formula (2) are preferable.

Examples of the compounds of the general formula (1) include bis(oxymethyl)tricyclo [$5.2.1.0^{2,6}$] decane diacrylate and bis(oxymethyl)tricyclo [$5.2.1.0^{2,6}$] decane dimethacrylate. These can be used also in combination. By use of these compounds, the hygroscopicity of the resulted resin can be decreased.

Examples of the compounds of the general formula (2) include ethylene glycol dimethacrylate, ethylene glycol diacrylate, 1,3-propanediol dimethacrylate, 1,3-propanediol diacrylate, 1,4-butylene glycol dimethacrylate, 1,6-hexanediol dimethacrylate, 2-methyl-1,3-propanediol dimethacrylate, neopentyl glycol dimethacrylate, neopentyl glycol diacrylate and 2,2'-dimethyl-1,4-butanediol dimethacrylate. From the standpoint of improvement in transparency, most preferable among compounds of the general formula (2) is neopentyl glycol dimethacrylate. These can be used also in combination. When n is 1 or more in the general formula (2), appearance tends to be excellent, and when n is 4 or less, heat resistance tends to be improved. In comparison with compounds of the general formula (1), when compounds of the general formula (2) are used, polymerization shrinkage tends to be larger, therefore, the content thereof is preferably from 35 to 70 wt % in the mixture. When the content of this compound is 35 wt % or more, heat resistance tends to be improved, and when 70 wt % or less, appearance tends to be excellent. Furthermore, the content is preferably 45 wt % or more. When compounds of the general formula (2) are used, the content of a mono-ethylenically unsaturated monomer containing an alkyl methacrylate having an alkyl group of 1 to 4 carton atoms is preferably from 30 to 65 wt % in the mixture. When the content is 30 wt % or more, appearance tends to be improved, and when 65 wt % or less, heat resistance tends to be improved. Furthermore, the content is preferably 55 wt % or less.

Next, the case of use of a mixture composed of a syrup consisting of a mono-ethylenically unsaturated monomer and a (co)polymer, and a poly-functional (meth)acrylate will be described.

The mixture in this case is composed of 5 to 65 parts by weight of a syrup consisting of 70 to 99 wt % of a mono-ethylenically unsaturated monomer containing an alkyl methacrylate having an alkyl group of 1 to 4 carbon atoms and 1 to 30 wt % of a (co)polymer composed of a mono-ethylenically unsaturated monomer unit containing an alkyl methacrylate having an alkyl group of 1 to 4 carbon atoms, and 35 to 95 parts by weight of a poly-functional (meth)acrylate having two or more (meth)acryloyl groups. The content of a syrup in 100 parts by weight of a mixture is preferably from 10 to 55 parts by weight, and more preferably from 15 to 50 parts by weight. The content of a poly-functional (meth)acrylate in 100 parts by weight of a mixture is preferably from 45 to 90 parts by weight, and more preferably from 50 to 85 parts by weight.

The content of a mono-ethylenically unsaturated monomer containing an alkyl methacrylate having an alkyl group of 1 to 4 carbon atoms constituting a syrup is 70 to 99 wt % in the syrup. When the content of this monomer is 70 wt % or more, heat resistance tends to be improved, and when 99 wt % or less, appearance tends to be improved.

Regarding specific examples of the alkyl methacrylate having an alkyl group of 1 to 4 carbon atoms constituting a syrup, specific examples of other mono-ethylenically unsaturated monomers, and suitable composition ratios of both the monomers, the same examples as described above are mentioned.

The (co)polymer constituting a syrup is composed of a mono-ethylenically unsaturated monomer containing an alkyl methacrylate having an alkyl group of 1 to 4 carbon atoms. Namely, it is a homopolymer of an alkyl methacrylate having an alkyl group of 1 to 4 carbon atoms or a copolymer of an alkyl methacrylate having an alkyl group of 1 to 4 carbon atoms with a mono-ethylenically unsaturated monomer copolymerizable with this. Hereinafter, this polymer or copolymer is appropriately referred to as "(co)polymer".

The content of this (co)polymer is 1 to 30 wt % in a syrup. When the content of a (co)polymer is 1 wt % or more, appearance tends to be improved and when 30 wt % or less, heat resistance tends to be improved.

Regarding specific examples of the alkyl methacrylate having an alkyl group having 1 to 4 carbon atoms constituting a (co)polymer, specific examples of other mono-ethylenically unsaturated monomers, and suitable composition ratios of both the monomers, the same examples as described above are mentioned.

As the poly-functional (meth)acrylate having two or more (meth)acryloyl groups constituting a mixture together with a syrup, the same compounds as described above are mentioned. The content of this poly-functional (meth)acrylate is 35 to 95 parts by weight in 100 parts by weight of a mixture with a syrup. When this content is 35 parts by weight or more, heat resistance tends to be improved, and when 95 parts by weight or less, appearance tends to be excellent. Furthermore, this content is preferably from 45 to 90 parts by weight, and more preferably from 50 to 85 parts by weight. When a compound of the general formula (2) is used as a poly-functional (meth)acrylate, the content of this compound is preferably from 35 to 70 parts by weight in 100 parts by weight of a mixture with syrup. When this content is 35 parts by weight or more, heat resistance tends to be improved, and when 70 parts by weight or less, appearance tends to be excellent. Furthermore, the content of this compound is preferably 45 parts by weight or more.

In the present invention, any one of the two kinds of mixtures described above is used, and 0.001 to 1 part by weight of a polymerization initiator having 10 hours half life temperature of 80° C. or more and 0.015 to 0.2 parts by weight of at least one compound selected from the group consisting of cyclohexadiene and derivatives thereof and terpenoid-based compounds and derivatives thereof are added, per 100 parts by weight of the mixture, to prepare a polymerizable mixture.

Examples of the polymerization initiator having 10 hours half life temperature of 80° C. or more include 1,1'-azobis (cyclohexane-1-carbonitrile) (10 hours half life temperature: 88° C.), 2,2'-azobis(2,4,4-trimethylpentene) (10 hours half life temperature: 110° C.), 2-cyano-2-propyrazoformamide (10 hours half life temperature: 104° C.), dicumyl peroxide (10 hours half life temperature: 117° C.), t-butylcumyl peroxide (10 hours half life temperature: 121° C.), di-t-butyl peroxide (10 hours half life temperature: 126° C.), t-butyl peroxy-3,3,5-trimethyl hexanoate (10 hours half life temperature: 100° C.), t-butyl peroxy laurate (10 hours half life temperature: 95° C.), t-butyl peroxy acetate (10 hours half life temperature: 103° C.), di-t-butyl peroxyhexahydro terephthalate (10 hours half life temperature: 83° C.), di-t-butyl peroxy azelate (10 hours half life temperature: 99° C.), t-butyl peroxyallyl carbonate (10 hours half life temperature: 94° C.), t-butyl peroxyisopropyl carbonate (10 hours half life temperature: 97° C.), 1,1-di-t-butyl peroxycyclohexane (10 hours half life temperature: 97° C.), t-hexyl peroxyisopropyl monocarbonate (10 hours half life temperature: 95° C.), 1,1-di-t-butyl peroxy-3,3,5-trimethylcyclohexane (10 hours half life temperature: 95° C.), and 1,1-di-t-hexyl peroxy-3,3,5-trimethylcyclohexane (10 hours half life temperature: 87° C.). These can be used also in combination. The upper limit of the 10 hours half life temperature is preferably 130° C.

The addition amount of a polymerization initiator having 10 hours half life temperature of 80° C. or more is 0.001 to 1 part by weight per 100 parts by weight of a mixture. When this addition amount is 0.001 part by weight or more, heat resistance tends to be improved even if cyclohexadiene, terpenoid-based compounds and derivatives thereof are added. When the addition amount is 1 part by weight or less, the amount of remaining initiators tends to decrease to enhance heat stability. Furthermore, this addition amount is preferably from 0.005 to 0.5 parts by weight.

It is also possible to use a polymerization initiator having 10 hours half life temperature of less than 80° C. together with such a polymerization initiator. Examples of the polymerization initiator having 10 hours half life temperature of less than 80° C. include t-butyl peroxy isobutylate (10 hours half life temperature: 77° C.), t-butyl peroxy-2-ethyl hexanoate (10 hours half life temperature: 72° C.), t-butyl peroxy pivalate (10 hours half life temperature: 55° C.), t-hexyl peroxy pivalate (10 hours half life temperature: 53° C.), t-butyl peroxy neodecanoate (10 hours half life temperature: 47° C.), 2,2'-azobisisobutyronitrile (10 hours half life temperature: 65° C.), 2,2'-azobis(2,4-dimethylvaleronitrile) (10 hours half life temperature: 51° C.) and 2,2'-azobis(2,4-dimethyl-4-methoxyvaleronitrile) (10 hours half life temperature: 30° C.). These can be used also in combination.

At least one compound selected from the group consisting of cyclohexadiene and derivatives thereof and terpenoid-based compounds and derivatives thereof is a component functioning as a polymerization regulator. Hereinafter, this is referred to as "compound (a)". Examples of this compound (a) include 1,4-cyclohexadiene, 1-methyl-1,4-cyclohexadiene, α-terpinene, β-terpinene, γ-terpinene, terpinolene, limonene, myrcene, α-pinene, β-pinene and terpinol. Particularly, terpinolene is preferable.

The addition amount of a compound (a) is 0.015 to 0.2 parts by weight per 100 parts by weight a mixture. When this addition amount is 0.015 parts by weight or more, plate cracking tends to be difficult in a peeling process in production, and when 0.2 parts by weight or less, the amount of remaining monomers tends to decrease to enhance heat stability. Here, the peeling process in production is a process from after completion of polymerization hardening to peeling of an acrylic resin plate from a mold. Furthermore, this addition amount is preferably from 0.02 to 0.15 parts by weight.

By polymerization-hardening a polymerizable mixture described above, an acrylic resin plate can be obtained. As the method of polymerization-hardening a polymerizable mixture, conventionally known various methods can be used. Particularly, a so-called casting polymerization method is preferable in which a polymerizable mixture is poured into a mold, polymerization-hardened, and peeled from the mold.

A method of casting polymerization using methyl methacrylate as an alkyl methacrylate having an alkyl group of 1 to 4 carbon atoms will be exemplified below. However, the present invention is not limited to this. First, methyl methacrylate, a poly-functional (meth)acrylate, if necessary, a (co)polymer containing a methyl methacrylate unit, further, if necessary, other copolymerizable mono-ethylenically unsaturated monomers, are charged in a suction bottle, and stirred to give a mixture. To this mixture is added a polymerization initiator and a polymerization regulator (compound (a)), and vacuum deaeration is conducted to give a polymerizable mixture. This polymerizable mixture is poured into a mold constituted of a gasket sandwiched by a pair of reinforced glass sheets, and placed in a heating furnace and polymerization-hardened at 40 to 70° C. for 2 to 5 hours and at 100 to 150° C. for 1 to 6 hours, and peeled from the mold to obtain an acrylic resin plate.

Instead of this reinforced glass sheet, for example, mirror finished surface SUS sheets, glass sheets having fine irregularity on the surface, and endless belts made of mirror finished surface SUS running in facing state, can also be used as a mold. The polymerization temperature and time may be appropriately selected depending on requirements.

The thickness of an acrylic resin plate is preferably 0.5 to 5 mm. When the plate thickness is 0.5 mm or more, there is a tendency of poor generation of cracking in peeling an acrylic resin plate from a mold in the case of producing a plate by block polymerization. When 5 mm or less, there is a tendency of poor plate cracking in polymerization.

The polymerizable mixture contains the above-mentioned components as main components, and if necessary, further, coloring agents, releasing agents, antioxidants, stabilizers, antistatic agents, anti-bacterial agents, flame retardants, impact resistant modifiers, photo-stabilizers, ultraviolet absorbers, light scattering agents, polymerization inhibitors and chain transfer agents can be added. For further decreasing the amount of remaining monomers in the resulted resin plate, it is preferable to add a chain transfer agent such as mercaptan.

Next, the acrylic resin of the present invention will be described.

The acrylic resin of the present invention comprises 3 to 30 wt % of an alkyl methacrylate unit having an alkyl group of 8 to 20 carbon atoms, 2 to 35 wt % of a mono-ethylenically unsaturated monomer unit containing an alkyl methacrylate unit having an alkyl group of 1 to 4 carbon atoms and 35 to 95 wt % of a poly-functional (meth)acrylate unit having two or more (meth)acryloyl groups.

Here, the content of each unit is a value showing the proportion of total monomer unit of one or more polymers constituting a resin. Namely, the acrylic resin of the present invention may be a resin composed of one copolymer obtained by copolymerizing three monomers constituting the above-mentioned units, or a resin obtained by making a part of at least one of three monomers constituting the above-mentioned units into a polymer previously, and polymerizing remaining monomers in the presence of this polymer. The latter resin can be obtained, for example, by polymerizing a syrup containing a (co)polymer of an alkyl methacrylate, and a desired monomer.

The content of the alkyl methacrylate unit having an alkyl group of 8 to 20 carbon atoms is 3 to 30 wt % in the resin. When this content is 3 wt % or more, shape stability tends to be improved, and when 30 wt % or less, heat resistance tends to be improved. Furthermore, this content is preferably from 5 to 20 wt %.

The alkyl methacrylate unit having an alkyl group of 8 to 20 carbon atoms includes units derived from 2-ethylhexyl methacrylate, lauryl methacrylate, tridecyl methacrylate, stearyl methacrylate and isostearyl methacrylate. These can be used also in combination.

The content of the mono-ethylenically unsaturated monomer unit containing an alkyl methacrylate unit having an alkyl group of 1 to 4 carbon atoms is 2 to 35 wt % in the resin. When this content is 2 wt % or more, appearance tends to be improved, and when 35 wt % or less, heat resistance and shape stability tend to be improved. Furthermore, this content is preferably from 5 to 25 wt %. When the total amount of mono-ethylenically unsaturated monomer units containing an alkyl methacrylate unit having an alkyl group of 1 to 4 carbon atoms is 100 parts by weight, the proportion of the alkyl methacrylate unit having an alkyl group of 1 to 4 carbon atoms is preferably 50 parts by weight or more, and the proportion of other mono-ethylenically unsaturated monomer units is preferably 50 parts by weight or less. With this proportion, transparency tends to be improved and heat resistance is further improved in some cases.

As specific examples of the alkyl methacrylate unit having an alkyl group of 1 to 4 carbon atoms, there are mentioned units derived from alkyl methacrylates of specific examples of the alkyl methacrylate having an alkyl group of 1 to 4 carbon atoms used in the method of producing an acrylic resin plate described previously.

As the mono-ethylenically unsaturated monomer units other than the alkyl methacrylate having an alkyl group of 1 to 4 carbon atoms, there are mentioned various units other than the alkyl methacrylate having an alkyl group of 8 to 20 carbon atoms. Specific examples thereof include units derived from corresponding monomers among mono-ethylenically unsaturated monomers used in the above-described method of producing an acrylic resin plate.

The content of a poly-functional (meth)acrylate unit having two or more (meth)acryloyl groups is 35 to 95 wt % in the resin. When this content is 35 wt % or more, heat resistance tends to be improved, and when 95 wt % or less, appearance tends to b excellent. This content is preferably from 45 to 90 wt % and more preferably from 50 to 85 wt %.

As specific examples of the poly-functional (meth)acrylate having two or more (meth)acryloyl groups, the same examples as the specific examples of a poly-functional (meth)acrylate used in the above-described method of producing an acrylic resin plate are mentioned. Among them, compounds of the general formula (1) are preferable.

The acrylic resin of the present invention is a resin containing the above-described monomer units as main constituent units. It is preferable to use this resin in the form of acrylic resin plate.

The method of producing a resin plate made of an acrylic resin of the pre-sent invention comprises polymerizing a polymerizable mixture comprising 3 to 30 wt % of an alkyl methacrylate having an alkyl group of 8 to 20 carbon atoms, 2 to 35 wt % of a mono-ethylenically unsaturated monomer containing an alkyl methacrylate having an alkyl group of 1 to 4 carbon atoms and 35 to 95 wt % of a polyfunctional (meth) acrylate having two or more (meth)acryloyl groups to harden the mixture. Specific examples of monomers used here are as described above.

As the method of polymerization-hardening a polymerizable mixture, conventionally known various methods can be used. Particularly, a so-called casting polymerization method is preferable in which a polymerizable mixture is poured into a mold, polymerization-hardened, and peeled from the mold.

For polymerization of a polymerizable mixture, conventionally known various radical initiators can be used. Specific examples of the radical initiator include t-butyl peroxy pivalate, t-hexyl peroxy pivalate, t-butyl peroxy neodecanoate, t-hexyl peroxy neodecanoate, t-butyl peroxy isopropyl carbonate, t-hexyl peroxy isopropyl monocarbonate, 2,2'-azobis (4-methoxy-2,4-dimethylvaleronitrile), 2,2'-azobis(2,4-dimethylvaleronitrile) and 2,2'-azobisisobutyronitrile. As the polymerization initiator, it is preferable to use a polymerization initiator having 10 hours half life temperature of 80° C. or more. The content thereof is preferably from 0.001 to 1 part by weight per 100 parts by weight of a mixture. Specific examples of the polymerization initiator having 10 hours half life temperature of 80° C. or more are as described above.

Next, a method of casting-polymerization using isostearyl methacrylate as an alkyl methacrylate having an alkyl group of 8 to 20 carbon atoms and methyl methacrylate as an alkyl methacrylate having an alkyl group having 1 to 4 carbon atoms will be exemplified. However, the present invention is not limited to this.

First, isostearyl methacrylate, methyl methacrylate, polyfunctional (meth)acrylate, and if necessary, a (co)polymer containing a methyl methacrylate unit, further, if necessary, other copolymerizable mono-ethylenically unsaturated monomers, are charged in an absorption bottle, and stirred to give a mixture. To this mixture is added a radical polymerization initiator, and vacuum deaeration is conducted. This mixture is poured into a mold constituted of a gasket sandwiched by a pair of reinforced glass sheets, and placed in a heating furnace and polymerization-hardened at 40 to 70° C. for 2 to 5 hours and at 100 to 150° C. for 1 to 6 hours, and peeled from the mold to obtain an acrylic resin plate.

Instead of this reinforced glass sheet, for example, mirror finished surface SUS sheets, glass sheets having fine irregularity on the surface, and endless belts made of mirror finished surface SUS running in facing state, can also be used as a mold. The polymerization temperature and time may be appropriately selected depending on requirements.

The thickness of an acrylic resin plate is preferably 0.5 to 5 mm. When the plate thickness is 0.5 mm or more, there is a tendency of poor generation of cracking in peeling an acrylic resin plate from a mold in the case of producing a plate by block polymerization. When 5 mm or less, there is a tendency of poor plate cracking in polymerization.

The polymerizable mixture contains the above-mentioned components as main components, and if necessary, further, coloring agents, releasing agents, antioxidants, stabilizers, antistatic agents, anti-bacterial agents, flame retardants, impact resistant modifiers, photo-stabilizers, ultraviolet absorbers, light scattering agents, polymerization inhibitors, polymerization regulators, chain transfer agents and the like can be added. As the polymerization regulator, it is preferable to use at least one compound selected from the group consisting of cyclohexadiene and derivatives thereof and terpenoid-based compounds and derivatives thereof. The content thereof is preferably from 0.015 to 0.2 parts by weight per 100 parts by weight of a mixture. Specific examples thereof are as described above. For reducing the amount of remaining monomers in the resulting resin plate, it is preferable to add a chain transfer agent such as mercaptan.

The acrylic resin plate of the present invention is a plate in which heat resistance, appearance, shape stability and a property of preventing plate cracking in a peeling process in production are improved significantly while maintaining excellent optical properties of an acrylic resin.

Such an acrylic resin plate can be used, for example, for peripheral materials of heat generating light sources such as incandescent lamp covers and halogen lamp covers; parts of heating household electric appliances such as cloth dehydrators, microwave ovens and electronic ovens; optical lenses such as spectacle lenses, sunglass lenses, camera lenses, video camera lenses, goggle lenses and contact lenses; vehicle mounted materials such as vehicle mounted parts such as meter covers, audio appliance parts for vehicle mounting, display apparatus parts for vehicle mounting, navigation system parts for vehicle mounting, and the like, further, front surface plates of various display apparatuses such as plasma display apparatuses, liquid crystal display apparatuses and projection-mode display apparatuses, various display members such as light conducting plates of liquid crystal displays.

<Transparent Electrically Conductive Membrane>

A transparent electrically conductive membrane can be formed on at least one surface of an acrylic resin plate obtained in the present invention, to give an acrylic resin laminate. This transparent electrically conductive membrane may advantageously be a transparent and electrically conductive thin membrane. For example, inorganic thin membranes and organic polymer thin membranes can be used.

Materials of the inorganic thin membrane include transparent metal oxides such as, for example, tin oxide, indium oxide and ITO (tin-added indium oxide). Of them, ITO is preferable. As material of the organic polymer thin membrane, for example, polyisothianaphthene are listed.

An acrylic resin laminated obtained by forming a transparent electrically conductive membrane such as ITO on at least one surface on an acrylic resin plate can be utilized for application of a transparent electrically conductive membrane. The laminate can be used, for example, for electric parts circuit materials such as condensers and resistors; materials for duplication such as electrophotography and electrostatic recording; transparent electrodes for signal input such as for liquid crystal display, for electrochromic display, for electroluminescence display and for tough panel; photoelectric transducing elements such as solar batteries and light amplifiers, additionally, various applications such as antistatic members, electromagnetic wave shielding members, plane heat generators and sensors. Among them, use as a transparent electrode plate for touch panel is preferable.

<Transparent Electrode Plate for Touch Panel>

The transparent electrode plate for touch panel of the present invention has an acrylic resin plate obtained by the present invention as a transparent base plate, and a transparent electrically conductive membrane formed on at least one surface of this acrylic resin plate. As the method of forming a transparent electrically conductive membrane on an acrylic resin plate, conventionally known various membrane forming methods can be used. Examples of the membrane forming method include vacuum membrane forming methods such as a vacuum vapor deposition method, sputtering method, CVD method and ion plating method. A specific example of forming an ITO thin membrane by a sputtering method will be described. First, a transparent base plate is washed with pure water or alkali water in a washing process, and dried in atmospheric air at 120° C. or more, preferably 120 to 130° C. for 1 to 4 hours. And under vacuum, ITO sputtering treatment is performed at temperatures from 100 to 140° C., preferably at 120° C. Thereafter, an electrode and lead electrode are painted with a silver paste, and hardened at 130 to 170° C., preferably at 150° C.

A transparent electrode plate for touch panel preferably has a deflection temperature under load of 150° C. or more. When the deflection temperature under load is 150° C. or more, there is a tendency of poor deformation of a resin base plate in hardening a silver paste. The deflection temperature under load of a transparent electrode plate is the same as the deflection temperature under load of an acrylic resin plate constituting a transparent electrode plate when the thickness of a transparent electrically conductive membrane is as small as 1 µm. In this case, the deflection temperature under load of an acrylic resin plate is measured and can be used as the deflection temperature under load of a transparent electrode plate without no problem.

The thickness of an acrylic resin plate used in a transparent electrode plate for touch panel is preferably from 0.5 to 2 mm, preferably from 0.5 to 1 mm. The thickness of a transparent electrically conductive membrane is preferably from 10 to 50 nm, more preferably from 25 to 40 nm. When thickness within these ranges is adopted, decreasing in weight and decreasing in thickness can be realized as compared with a transparent electrode plate for touch panel using a glass base plate.

It is preferable that an acrylic resin plate used for a transparent electrode plate for touch panel is not colored. It is also possible to form a reflection preventing membrane on the side carrying no transparent electrically conductive membrane. When the thickness of a transparent electrode plate for touch panel is 1 mm, its whole beam transmittance is preferably 91% or more in terms of a value according to a method for measuring whole beam transmittance defined in JIS-K 7361. When the whole beam transmittance is 91% or more, sufficient transparency for a transparent electrode plate for touch panel can be obtained.

<Touch Panel>

The touch panel of the present invention is a touch panel having an upper transparent electrode plate and a lower transparent electrode plate wherein the upper transparent electrode plate and the lower transparent electrode plate are a transparent electrode plate having a transparent base plate and a transparent electrically conductive membrane formed on at least one surface of the transparent base plate and the upper transparent electrode plate and the lower transparent electrode plate are placed at an interval so that the transparent electrically conductive membranes face mutually, and is characterized in that at least one of the upper transparent electrode plate and the lower transparent electrode plate is a transparent electrode plate for touch panel of the present invention.

Figure 2:
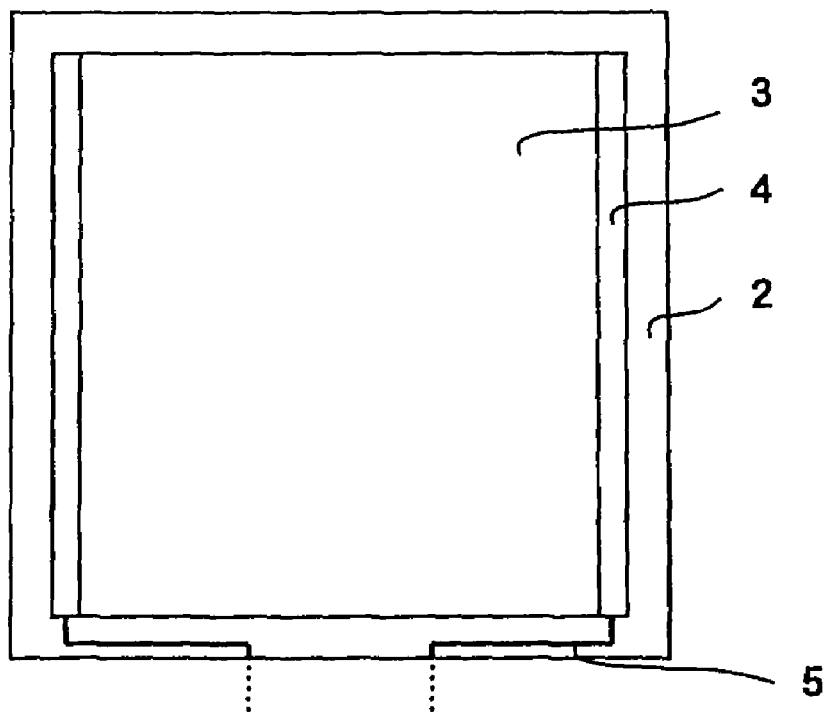
FIG. 2 is a schematic plane view showing one example of a transparent electrode plate for touch panel of the present invention.

Suitable examples of the transparent electrode plate for touch panel of the present invention and a touch panel using this will be described using FIGS. 1 to 3. FIG. 1 is a schematic sectional view showing one examples of the transparent electrode plate for touch panel of the present invention, and FIG. 2 is its schematic plane view. FIG. 3 is a schematic sectional view showing one example of a touch panel in which the transparent electrode plate shown in FIG. 1 and FIG. 2 is used as a lower transparent electrode plate.

The touch panel shown in FIG. 3 has a structure in which a lower transparent electrode plate 1 and an upper transparent electrode plate 7 are placed in facing state via a spacer 6. The lower transparent electrode plate 1 has a transparent base plate 2, a transparent electrically conductive membrane 3 formed on one surface of this transparent base plate 2, and an electrode 4 at the end on the transparent electrically conductive membrane 3, the electrode 4 being connected to a lead electrode 5, as shown in FIG. 1 and FIG. 2. The upper transparent electrode plate 7 also has the same structure as that of the lower transparent electrode plate 1. That is, the upper transparent electrode plate 7 has likewise a transparent base plate 8, transparent electrically conductive membrane 9 and an electrode 10, and the like.

The lower transparent electrode plate 1 and the upper transparent electrode plate 7 are placed at a certain interval via a spacer 6 so that respective transparent electrically conductive membranes 3 and 9 are positioned inside, dot spacers 11 intervene between both the transparent electrode plates 1 and 7, and both the electrodes 4 and 10 cross. When a touch panel having such a constitution is pressed with a pen or finger from the upper side of the upper transparent electrode plate 7, the upper transparent electrode plate 7 is deformed and the lower transparent electrically conductive membrane 3 and the upper transparent electrically conductive membrane 9 contact to cause continuity via the dot spacers 11, completing input.

The transparent electrode plate for touch panel of the present invention has high transparency and also high rigidity, therefore, it is suitably used as the lower transparent electrode plate 1. FIGS. 1 to 3 show such an example. However, the present invention is not limited to this. For example, the transparent electrode plate for touch panel of the present invention may be used as the upper transparent electrode plate 7 or, may be used as both the lower transparent electrode plate 1 and the upper transparent electrode plate 7.

The present invention will be illustrated further specifically by examples below. In the following descriptions, "parts" are by weight. Evaluations in tables were conducted according to the following methods.
(1) Evaluation of Acrylic Resin Plate:
(1-1) Deflection Temperature Under Load:
For evaluating the heat resistance of an acrylic resin plate, deflection temperature under load was measured according to a measuring method defined in JIS-K 7207.
(1-2) Haze:
For evaluating the optical property of an acrylic resin plate, haze was measured according to a measuring method defined in JIS-K 7136.
(1-3) Plate Cracking Preventing Property:
For evaluating a property of preventing cracking of an acrylic resin plate, 10 pieces of samples were manufactured, and after completion of polymerization-hardening, a mold was cooled to 40° C. or lower, and the number of samples causing no plate cracking until peeling of the acrylic resin plate from the mold was shown as n/10.
(1-4) Appearance:
For evaluating the appearance of an acrylic resin plate, 10 pieces of samples were manufactured, and the number of samples causing no defects such as whitening and dent by visual observation was shown as n/10.
(1-5) Remaining Monomer Amount:
For evaluating the amount of remaining monomers of an acrylic resin plate, 0.1 g of a sample cut into particles using a nipper was added in 20 ml of methyl chloride, and allowed to stand still at 23° C. for 4 days, then, the supernatant solution was injected in a gas chromatograph and the amount of remaining monomers was measured. The measurement conditions for the gas chromatograph are shown below.
Apparatus: HP 6890 manufactured by Hewlett Packard
Data treatment apparatus: HP ChemiStationp
Column used: HP-5 0.32 mmφ×30 m×0.25 μm membrane thickness
Column temperature condition: 40° C./1 min keeping→290° C./3 min keeping, 20° C./min temperature raising
INJ temperature: 280° C.
Carrier gas (He) flow rate: 20.0 ml/min
(2) Evaluation of Acrylic Resin Laminate:
(2-1) Warping Amount:
For evaluating the shape stability of an acrylic resin laminate, a shape stability test was conducted and its warped amount was measured. Specifically, a sample of 190 mm×190 mm×1.0 mm (thickness) was left in a thermo-hygrostat chamber of 23° C. and 50% RH for 1 day, then, suspended with a clip in a thermo-hygrostat chamber of 60° C. and 90% RH and left for 10 days, again, left in a thermo-hygrostat chamber of 23° C. and 50% RH for 1 hour, then, cooled and the wrapped amount was measured. In measurement of this warped amount, a sample was placed on a horizontal board so as to give a convex condition, and the distance a (mm) from the board surface to the lower side of a portion most distant from the board surface was measured by calipers, and the ratio of this distance to the sample length was used as the warped amount (%). Namely Warped amount (%)=a/190×100

Here, in the case of convex warping toward the side of a transparent electrically conductive membrane, warped amount was indicated as plus value, and in the case of concave warping toward the side of a transparent electrically conductive membrane, warped amount was indicated as minus value.
(3) Evaluation of Transparent Electrode Plate for Touch Panel:
(3-1) Whole Beam Transmittance:
For evaluating the transparency of a transparent electrode plate for touch panel, the whole beam transparency was measured according to a measuring method defined in JIS-K 7361.
(3-2) Deformation of Base Plate:
Regarding the presence or absence of deformation of an acrylic resin plate (base plate), the acrylic resin plate was visually observed in a series of processes of producing a transparent electrode plate for touch panel such as drying of a base plate before formation of a transparent electrically conductive membrane (ITO), subsequent membrane formation by a sputtering method, and painting and hardening of a silver paste after membrane formation, and no deformation of an acrylic resin plate was evaluated as ○ (good) and generation of deformation was evaluated as × (no good).
(3-3) Condition of ITO:
Regarding the condition of a transparent electrically conductive membrane (ITO), the transparent electrically conductive membrane was visually observed in a series of processes of producing a transparent electrode plate for touch panel such as membrane formation by a sputtering method, and painting and hardening of a silver paste after membrane formation, and no observation of optical strain, crack and the like was evaluated as ○ (good) and observation of optical strain, crack and the like was evaluated as × (no good).
(3-4) Close Adherence:
On a transparent electrically conductive membrane of a transparent electrode plate for touch panel, each 11 of longitudinal and transverse cuts in the form of lattice reaching to a resin base plate were made at an interval of 1 mm, to give 100 squares of 1×1 mm. A sticky tape (Cellophane tape, trade name, manufactured by Nichiban Co., Ltd.) was allowed to adhere sufficiently to this square and peeled quickly toward 45° front direction. The number (n) of squares remained without peeling of a transparent electrically conductive membrane in this procedure was indicated as n/100. Specifically, it is suitable that the value of n is preferably 96 or more, more preferably 100. When the value of n is larger, the close adherence of a transparent electrically conductive membrane is higher and a transparent electrode plate for touch panel is more excellent.
<Production of Acrylic Resin Plate>

EXAMPLE 1

0.05 parts of 2,2'-azobis(2,4-dimethyl-4-methoxyvaleronitrile), 0.05 parts of t-hexyl peroxy pivalate and 0.05 parts of t-hexyl peroxy isopropyl monocarbonate as polymerization initiators and 0.03 parts of terpinolene as a polymerization regulator were mixed in 100 parts of a mixture composed of 10 parts of isostearyl methacrylate ("NK Ester S-1800 M", manufactured by Shin Nakamura Kagaku Kogyo K.K.), 10 parts of methyl methacrylate and 80 parts of bis(oxymethyl) tricyclo [5.2.1.0$^{2,6}$] decane dimethacrylate, and the mixture was charged in a suction bottle and stirred, and subjected to vacuum deaeration to obtain a polymerizable mixture.

This polymerizable mixture was poured into a mold constituted of a gasket sandwiched by a pair of reinforced glass sheets at an interval of 1.7 mm, defoamed and placed in a heating furnace and polymerized at 55° C. for 1 hour, 50° C. for 1 hour, subsequently 135° C. for 3 hours. Then, the mold was cooled to 40° C. or lower to cause peeling, and heating at 130° C. was conducted for 4 hours to obtain an acrylic resin plate having a thickness of 1 mm.

This resin plate did not manifest plate cracking during cooling after polymerization-hardening, and caused no plate cracking also in peeling and removal. This resin plate had excellent appearance without whitening and dent. Haze was measured to find a value of 0.2%, showing excellent transparency. The deflection temperature under load was over 200° C. The remaining monomer amount of bis(oxymethyl)tricyclo [5.2.1.0$^{2,6}$] decane dimethacrylate was 2.34%. The main raw material composition and evaluation result of the polymerizable mixture in this example are shown in Table 1.

EXAMPLES 2 TO 24, COMPARATIVE EXAMPLES 1 TO 9

An acrylic resin plate was produced in the same manner as in Example 1 except that raw material compositions shown in Tables 1 to 6 were adopted. The evaluation results are shown in Tables 1 to 6.

EXAMPLE 25

An acrylic resin plate was produced in the same manner as in Example 1 except that 0.05 parts of n-dodecylmercaptan was further added as a chain transfer agent to a polymerizable mixture in Example 1. The evaluation results are shown in Table 7. The remaining monomer amount of bis(oxymethyl) tricyclo [5.2.1.0$^{2,6}$] decane dimethacrylate was 2.09%.

EXAMPLE 26

An acrylic resin plate was produced in the same manner as in Example 1 except that 5 parts of isosteary methacrylate and 5 parts of methyl acrylate were used instead of 10 parts of isosteary methacrylate in Example 1. The evaluation results are shown in Table 7. The remaining monomer amount of bis(oxymethyl)tricyclo [5.2.1.0$^{2,6}$] decane dimethacrylate was 2.03%.

<Formation of Transparent Electrically Conductive Membrane>

The acrylic resin plates obtained in Examples 1 to 26 and Comparative Examples 1 to 9 were washed with pure water and placed in a hot air drying furnace and dried with hot air of 120° C. for 2 hours. Then, ITO as a transparent electrically conductive membrane was formed on a resin plate by a sputtering method, to obtain an acrylic resin laminate. The thickness of the transparent electrically conductive membrane was controlled to about 30 nm. In this sputtering, $In_2O_3$/$SnO_2$=95/5 weight ratio was used as a target, atmosphere was exhausted to $10^{-3}$ Pa, and RF sputtering was conducted under heating at 120° C. using argon/oxygen=92.5/7.5 volume ratio as an introduction gas. The warped amounts of the resulted acrylic resin laminates after a shape stability test are shown in Tables 1 to 7.

<Production of Transparent Electrode Plate for Touch Panel>

The above-mentioned acrylic resin laminates were cut into samples of 250 mm (transverse)×180 mm (longitudinal), and a silver paste was painted on them in a given pattern and hardened at 150° C. to form electrodes and lead electrodes, to produce transparent electrode plates for touch panel having a constitution shown in FIG. 1 and FIG. 2. The thickness of this electrode and lead electrode was controlled to about 10 μm. The evaluation results of the resulted transparent electrode plates for touch panel are shown in Tables 1 to 7.

<Touch Panel>

Using the above-mentioned transparent electrode plates for touch panel as a lower transparent electrode plate 1, touch panels having a constitution shown in FIG. 3 were produced. Specifically, the above-mentioned transparent electrode plates for touch panel were used as a lower transparent electrode plate 1. Used as an upper transparent electrode plate 7 was that obtained by forming an ITO membrane having a thickness of about 25 nm on a polyethylene terephthalate film (manufactured by Teijin Ltd., trade name: Tetron film) having a thickness of 188 μm by the same method as for the lower transparent electrode plate. As a spacer 6, a double-adhesive tape having a thickness of 100 μm was used.

On the lower transparent electrically conductive membrane 3, a photo-hardening type acrylic resin was painted in a given pattern, hardened by irradiation with ultraviolet ray, to form dot spacers 11 having a height of 10 μm and a diameter of 50 μm so that they were arranged in staggered condition at a pitch of 3 mm. Furthermore, an insulation membrane (not shown) was formed on an electrode 4 and an electrode 10. The lower transparent electrode plate 1 and the upper transparent electrode plate 7 were fabricated so that they faced via the spacer 6, to produce a touch panel having size corresponding to 12 inch, namely, of 250 mm (transverse)×180 mm (longitudinal).

TABLE 1

| | | C8-20 alkyl group-containing alkyl methacrylate | | MMA | poly-functional (meth)acrylate | | polymerization initiator | | polymerization regulator TP | acrylic resin plate | |
|---|---|---|---|---|---|---|---|---|---|---|---|
| | | | | | | | | | | deflection temperature under load | haze |
| | | kind | (part) | (part) | kind | (part) | kind | (part) | (part) | (° C.) | (%) |
| Examples | 1 | ISMA | 10 | 10 | TDMA | 80 | ADMVN | 0.05 | 0.03 | over 200 | 0.2 |
| | | | | | | | HPP | 0.05 | | | |
| | | | | | | | HPIC | 0.05 | | | |
| | 2 | ISMA | 5 | 15 | TDMA | 80 | ADMVN | 0.05 | 0.03 | over 200 | 0.2 |
| | | | | | | | HPP | 0.05 | | | |
| | | | | | | | HPIC | 0.05 | | | |

TABLE 1-continued

| | | kind | (part) | (part) | kind | (part) | kind | (part) | (part) | (°C.) | (%) |
|---|---|---|---|---|---|---|---|---|---|---|---|
| | 3 | ISMA | 10 | 20 | TDMA | 70 | ADMVN | 0.05 | 0.03 | 197 | 0.2 |
| | | | | | | | HPP | 0.05 | | | |
| | | | | | | | HPIC | 0.05 | | | |
| | 4 | LMA | 10 | 20 | TDMA | 70 | ADMVN | 0.05 | 0.03 | 190 | 0.2 |
| | | | | | | | HPP | 0.05 | | | |
| | | | | | | | HPIC | 0.05 | | | |
| | 5 | TMA | 10 | 20 | TDMA | 70 | ADMVN | 0.05 | 0.03 | 196 | 0.2 |
| | | | | | | | HPP | 0.05 | | | |
| | | | | | | | HPIC | 0.05 | | | |
| | 6 | SMA | 10 | 20 | TDMA | 70 | ADMVN | 0.05 | 0.03 | 200 | 0.2 |
| | | | | | | | HPP | 0.05 | | | |
| | | | | | | | HPIC | 0.05 | | | |
| | 7 | ISMA | 5 | 25 | TDMA | 70 | ADMVN | 0.05 | 0.03 | 198 | 0.2 |
| | | | | | | | HPP | 0.05 | | | |
| | | | | | | | HPIC | 0.05 | | | |

| | | acrylic resin plate | | acrylic resin laminate warped amount (%) | transparent electrode plate for touch panel | | | |
|---|---|---|---|---|---|---|---|---|
| | | plate cracking preventing property | appearance | | whole beam transmittance (%) | deformation of base plate | condition of ITO | close adherence |
| Examples | 1 | 10/10 | 10/10 | 0.2 | 92 | ○ | ○ | 100/100 |
| | 2 | 10/10 | 10/10 | 0.3 | 92 | ○ | ○ | 100/100 |
| | 3 | 10/10 | 10/10 | 0.3 | 92 | ○ | ○ | 100/100 |
| | 4 | 10/10 | 10/10 | 0.3 | 92 | ○ | ○ | 100/100 |
| | 5 | 10/10 | 10/10 | 0.3 | 92 | ○ | ○ | 100/100 |
| | 6 | 10/10 | 10/10 | 0.3 | 92 | ○ | ○ | 100/100 |
| | 7 | 10/10 | 10/10 | 0.4 | 92 | ○ | ○ | 100/100 |

TABLE 2

| | | C8-20 alkyl group-containing alkyl methacrylate | | MMA | poly-functional (meth)acrylate | | polymerization initiator | | polymerization regulator TP | acrylic resin plate | |
|---|---|---|---|---|---|---|---|---|---|---|---|
| | | kind | (part) | (part) | kind | (part) | kind | (part) | (part) | deflection temperature under load (°C.) | haze (%) |
| Examples | 8 | ISMA | 20 | 5 | TDMA | 75 | ADMVN | 0.05 | 0.03 | 190 | 0.2 |
| | | | | | | | HPP | 0.05 | | | |
| | | | | | | | HPIC | 0.05 | | | |
| | 9 | ISMA | 15 | 20 | TDMA | 65 | ADMVN | 0.05 | 0.03 | 171 | 0.2 |
| | | | | | | | HPP | 0.05 | | | |
| | | | | | | | HPIC | 0.05 | | | |
| | 10 | ISMA | 20 | 25 | NPG | 55 | ADMVN | 0.05 | 0.03 | over 200 | 0.2 |
| | | | | | | | HPP | 0.05 | | | |
| | | | | | | | HPIC | 0.05 | | | |
| | 11 | — | — | 20 | TDMA | 80 | ADMVN | 0.05 | 0.03 | over 200 | 0.2 |
| | | | | | | | HPP | 0.05 | | | |
| | | | | | | | HPIC | 0.05 | | | |
| | 12 | — | — | 10 | TDMA | 90 | ADMVN | 0.05 | 0.03 | over 200 | 0.2 |
| | | | | | | | HPP | 0.05 | | | |
| | | | | | | | HPIC | 0.05 | | | |
| | 13 | — | — | 50 | TDMA | 50 | ADMVN | 0.05 | 0.03 | 157 | 0.2 |
| | | | | | | | HPP | 0.05 | | | |
| | | | | | | | HPIC | 0.05 | | | |

| | | acrylic resin plate | | acrylic resin laminate warped amount (%) | transparent electrode plate for touch panel | | | |
|---|---|---|---|---|---|---|---|---|
| | | plate cracking preventing property | appearance | | whole beam transmittance (%) | deformation of base plate | condition of ITO | close adherence |
| Examples | 8 | 10/10 | 10/10 | 0.1 | 92 | ○ | ○ | 100/100 |
| | 9 | 10/10 | 10/10 | 0.2 | 92 | ○ | ○ | 100/100 |
| | 10 | 10/10 | 10/10 | 0.3 | 92 | ○ | ○ | 100/100 |
| | 11 | 10/10 | 10/10 | 1.0 | 92 | ○ | ○ | 100/100 |
| | 12 | 10/10 | 10/10 | 0.7 | 92 | ○ | ○ | 100/100 |
| | 13 | 10/10 | 10/10 | 1.3 | 92 | ○ | ○ | 100/100 |

TABLE 3

| | | C8-20 alkyl group-containing alkyl methacrylate | | MMA | poly-functional (meth)acrylate | | polymerization initiator | | polymerization regulator TP | acrylic resin plate deflection temperature under load | haze |
|---|---|---|---|---|---|---|---|---|---|---|---|
| | | kind | (part) | (part) | kind | (part) | kind | (part) | (part) | (° C.) | (%) |
| Examples | 14 | — | — | 20 | TDMA | 80 | ADMVN | 0.05 | 0.05 | over 200 | 0.2 |
| | | | | | | | HPP | 0.05 | | | |
| | | | | | | | HPIC | 0.05 | | | |
| | 15 | — | — | 20 | TDMA | 80 | ADMVN | 0.05 | 0.02 | over 200 | 0.2 |
| | | | | | | | HPP | 0.05 | | | |
| | | | | | | | HPIC | 0.05 | | | |
| | 16 | — | — | 20 | TDMA | 80 | ADMVN | 0.05 | 0.03 | over 200 | 0.2 |
| | | | | | | | HPP | 0.05 | | | |
| | | | | | | | HPIC | 0.03 | | | |
| | 17 | — | — | 20 | TDMA | 80 | ADMVN | 0.05 | 0.03 | over 200 | 0.2 |
| | | | | | | | HPP | 0.05 | | | |
| | | | | | | | BPIC | 0.05 | | | |

| | | acrylic resin plate | | acrylic resin laminate warped amount (%) | transparent electrode plate for touch panel | | | |
|---|---|---|---|---|---|---|---|---|
| | | plate cracking preventing property | appearance | | whole beam transmittance (%) | deformation of base plate | condition of ITO | close adherence |
| Examples | 14 | 10/10 | 10/10 | 1.0 | 92 | ○ | ○ | 100/100 |
| | 15 | 10/10 | 10/10 | 1.0 | 92 | ○ | ○ | 100/100 |
| | 16 | 10/10 | 10/10 | 1.1 | 92 | ○ | ○ | 100/100 |
| | 17 | 10/10 | 10/10 | 1.0 | 92 | ○ | ○ | 100/100 |

TABLE 4

| | | methyl methacrylate polymer | | MMA | poly-functional (meth)acrylate | | polymerization initiator | | polymerization regulator TP | acrylic resin plate deflection temperature under load | haze |
|---|---|---|---|---|---|---|---|---|---|---|---|
| | | Mn | (part) | (part) | kind | (part) | kind | (part) | (part) | (° C.) | (%) |
| Examples | 18 | 450000 | 3.75 | 46.25 | NPG | 50 | ADMVN | 0.03 | 0.03 | 189 | 0.2 |
| | | | | | | | HPP | 0.01 | | | |
| | | | | | | | BPIC | 0.01 | | | |
| | 19 | 450000 | 3.75 | 46.25 | NPG | 50 | ADMVN | 0.03 | 0.06 | 190 | 0.2 |
| | | | | | | | HPP | 0.01 | | | |
| | | | | | | | BPIC | 0.01 | | | |
| | 20 | 450000 | 3.75 | 46.25 | NPG | 50 | ADMVN | 0.03 | 0.1 | 190 | 0.2 |
| | | | | | | | HPP | 0.01 | | | |
| | | | | | | | BPIC | 0.01 | | | |
| | 21 | 450000 | 3.75 | 46.25 | NPG | 50 | ADMVN | 0.03 | 0.02 | 187 | 0.2 |
| | | | | | | | HPP | 0.01 | | | |
| | | | | | | | BPIC | 0.01 | | | |
| | 22 | 450000 | 3 | 37 | NPG | 60 | ADMVN | 0.03 | 0.03 | over 200 | 0.2 |
| | | | | | | | HPP | 0.01 | | | |
| | | | | | | | BPIC | 0.01 | | | |
| | 23 | 45000 | 4.13 | 50.87 | NPG | 45 | ADMVN | 0.03 | 0.03 | 167 | 0.2 |
| | | | | | | | HPP | 0.01 | | | |
| | | | | | | | BPIC | 0.02 | | | |
| | 24 | — | 0 | 50 | NPG | 50 | ADMVN | 0.03 | 0.03 | 190 | 0.2 |
| | | | | | | | HPP | 0.01 | | | |
| | | | | | | | BPIC | 0.01 | | | |

TABLE 4-continued

|  |  | acrylic resin plate | | acrylic resin | transparent electrode plate for touch panel | | | |
|---|---|---|---|---|---|---|---|---|
|  |  | plate cracking preventing property | appearance | laminate warped amount (%) | whole beam transmittance (%) | deformation of base plate | condition of ITO | close adherence |
| Examples | 18 | 10/10 | 10/10 | 1.9 | 92 | ○ | ○ | 100/100 |
|  | 19 | 10/10 | 10/10 | 1.9 | 92 | ○ | ○ | 100/100 |
|  | 20 | 10/10 | 10/10 | 1.9 | 92 | ○ | ○ | 100/100 |
|  | 21 | 10/10 | 10/10 | 1.8 | 92 | ○ | ○ | 100/100 |
|  | 22 | 10/10 | 10/10 | 2.0 | 92 | ○ | ○ | 100/100 |
|  | 23 | 10/10 | 10/10 | 1.9 | 92 | ○ | ○ | 100/100 |
|  | 24 | 10/10 | 10/10 | 1.9 | 92 | ○ | ○ | 100/100 |

TABLE 5

|  |  | C8-20 alkyl group-containing alkyl methacrylate | | MMA | poly-functional (meth)acrylate | | polymerization initiator | | polymerization regulator TP | acrylic resin plate | |
|---|---|---|---|---|---|---|---|---|---|---|---|
|  |  | kind | (part) | (part) | kind | (part) | kind | (part) | (part) | deflection temperature under load (°C.) | haze (%) |
| Comparative Examples | 1 | — | 0 | 20 | TDMA | 80 | ADMVN HPP HPIC | 0.05 0.05 0.05 | 0 | over 200 | 0.2 |
|  | 2 | — | 0 | 20 | TDMA | 80 | ADMVN HPP HPIC | 0.05 0.05 0.05 | 0.005 | over 200 | 0.2 |
|  | 3 | — | 0 | 70 | TDMA | 30 | ADMVN HPP HPIC | 0.05 0.05 0.05 | 0.03 | 120 | 0.2 |
|  | 4 | — | 0 | 50 | TDMA | 50 | ADMVN HPP | 0.05 0.05 | 0.03 | 140 | 0.2 |
|  | 5 | ISMA | 5 | 65 | TDMA | 30 | ADMVN HPP HPIC | 0.05 0.05 0.05 | 0.03 | 115 | 0.2 |

|  |  | acrylic resin plate | | acrylic resin | transparent electrode plate for touch panel | | | |
|---|---|---|---|---|---|---|---|---|
|  |  | plate cracking preventing property | appearance | laminate warped amount (%) | whole beam transmittance (%) | deformation of base plate | condition of ITO | close adherence |
| Comparative Examples | 1 | 1/10 | 8/10 | 1.0 | 92 | ○ | ○ | 100/100 |
|  | 2 | 3/10 | 10/10 | 1.0 | 92 | ○ | ○ | 100/100 |
|  | 3 | 10/10 | 10/10 | 1.7 | 92 | x | x | 70/100 |
|  | 4 | 10/10 | 10/10 | 1.3 | 92 | x | x | 82/100 |
|  | 5 | 10/10 | 10/10 | deformation in forming | 92 | x | x | 68/100 |

TABLE 6

|  |  | methyl methacrylate polymer | | MMA | poly-functional (meth)acrylate | | polymerization initiator | | polymerization regulator TP | acrylic resin plate | |
|---|---|---|---|---|---|---|---|---|---|---|---|
|  |  | Mn | (part) | (part) | kind | (part) | kind | (part) | (part) | deflection temperature under load (°C.) | haze (%) |
| Comparative Examples | 6 | 450000 | 3.75 | 46.25 | NPG | 50 | ADMVN HPP BPIC | 0.03 0.01 0.01 | 0 | 184 | 0.2 |
|  | 7 | 450000 | 3.75 | 46.25 | NPG | 50 | ADMVN HPP BPIC | 0.03 0.01 0.01 | 0.005 | 185 | 0.2 |

TABLE 6-continued

| | | | | | | | | | | | |
|---|---|---|---|---|---|---|---|---|---|---|---|
| | 8 | 450000 | 5.25 | 64.75 | NPG | 30 | ADMVN | 0.03 | 0.03 | 141 | 0.2 |
| | | | | | | | HPP | 0.01 | | | |
| | | | | | | | BPIC | 0.01 | | | |
| | 9 | — | 0 | 50 | NPG | 50 | ADMVN | 0.03 | 0.005 | 184 | 0.2 |
| | | | | | | | HPP | 0.01 | | | |
| | | | | | | | BPIC | 0.01 | | | |

| | | acrylic resin plate | | acrylic resin | transparent electrode plate for touch panel | | | |
|---|---|---|---|---|---|---|---|---|
| | | plate cracking preventing property | appearance | laminate warped amount (%) | whole beam transmittance (%) | deformation of base plate | condition of ITO | close adherence |
| Comparative Examples | 6 | 1/10 | 7/10 | 1.9 | 92 | ○ | ○ | 100/100 |
| | 7 | 3/10 | 10/10 | 1.9 | 92 | ○ | ○ | 100/100 |
| | 8 | 10/10 | 10/10 | 1.8 | 92 | x | x | 83/100 |
| | 9 | 0/10 | 0/10 | 1.9 | 92 | ○ | ○ | 100/100 |

TABLE 7

| | | C8-20 alkyl group-containing alkyl methacrylate | | MMA | poly-functional (meth)acrylate | | polymerization initiator | | polymerization regulator TP | acrylic resin plate | |
|---|---|---|---|---|---|---|---|---|---|---|---|
| | | kind | (part) | (part) | kind | (part) | kind | (part) | (part) | deflection temperature under load (°C.) | haze (%) |
| Examples | 25 | ISMA | 10 | 10 | TDMA | 80 | ADMVN | 0.05 | 0.03 | over 200 | 0.2 |
| | | | | | | | HPP | 0.05 | | | |
| | | | | | | | HPIC | 0.05 | | | |
| | 26 | ISMA | 5 | 10 | TDMA | 80 | ADMVN | 0.05 | 0.03 | over 200 | 0.2 |
| | | | | | | | HPP | 0.05 | | | |
| | | | | | | | HPIC | 0.05 | | | |

| | | acrylic resin plate | | acrylic resin | transparent electrode plate for touch panel | | | |
|---|---|---|---|---|---|---|---|---|
| | | plate cracking preventing property | appearance | laminate warped amount (%) | whole beam transmittance (%) | deformation of base plate | condition of ITO | close adherence |
| Examples | 25 | 10/10 | 10/10 | 0.2 | 92 | ○ | ○ | 100/100 |
| | 26 | 10/10 | 10/10 | 0.3 | 92 | ○ | ○ | 100/100 |

* Example 25 further contains 0.05 parts of n-dodecylmercaptan.
* Example 26 further contains 5 parts of methyl acrylate.

Abbreviations in the tables have the following meanings.
ADMVN: 2,2'-azobis(2,4-dimethyl-4-methoxyvaleronitrile) (10 hours half life temperature: 30° C.)
HPP: t-hexyl peroxy pivalate (10 hours half life temperature: 53° C.)
HPIC: t-hexyl peroxy isopropyl monocarbonate (10 hours half life temperature: 95° C.)
BPIC: t-butyl peroxy isopropyl carbonate (10 hours half life temperature: 97° C.)
TDMA: bis(oxymethyl)tricyclo [$5.2.1.0^{2,6}$] decane dimethacrylate
NPG: neopentyl glycol dimethacrylate
ISMA: isostearyl methacrylate
MMA: methyl methacrylate
LMA: lauryl methacrylate
TMA: tridecyl methacrylate
SMA: stearyl methacrylate
TP: terpinolene
Mn: number-average molecular weight As shown in Tables 1 to 4 and 7, excellent results were obtained on the heat resistance, transparency and plate cracking preventing property of acrylic resin plates, and the transparency, appearance and close adherence of transparent electrode plate for touch panels, in Examples 1 to 26. Touch panels also acted normally. Furthermore, in Examples 1 to 10, 25 and 26, excellent results were obtained on the shape stability of acrylic resin laminates. In Examples 25 and 26, the amount of remaining monomers decrease as compared with Example 1.

On the other hand, as shown in Tables 5 and 6, problems occurred such as plate cracking in a process of peeling an acrylic resin plate, in Comparative Examples 1, 2, 6, 7 and 9. In Comparative Examples 3 to 5 and 8, the heat resistance of an acrylic resin plate was low, deformation occurred in heating at 120° C. in forming ITO and in heating at 150° C. in forming an electrode, meaning unsuitability for a touch panel.

The invention claimed is:

1. A method of producing an acrylic resin plate, comprising:
    a step of adding 0.001 to 1 part by weight of a polymerization initiator having 10 hours half life temperature of 80° C. or more and 0.015 to 0.2 parts by weight of at least one compound selected from the group consisting of cyclohexadiene and derivatives thereof and terpenoid-based compounds and derivatives thereof into 100 parts by weight of a mixture composed of 5 to 65 wt % of a mono-ethylenically unsaturated monomer containing an alkyl methacrylate having an alkyl group of 1 to 4 carbon atoms and 35 to 95 wt % of bis(oxymethyl)tricyclo[$5.2.1.0^{2,6}$]decane dimethacrylate to give a polymerizable mixture, and
    a step of polymerizing said polymerizable mixture to harden the mixture.

2. A method of producing an acrylic resin plate, comprising:
    a step of adding 0.001 to 1 part by weight of a polymerization initiator having 10 hours half life temperature of 80° C. or more and 0.015 to 0.2 parts by weight of at least one compound selected from the group consisting of cyclohexadiene and derivatives thereof and terpenoid-based compounds and derivatives thereof into 100 parts by weight of a mixture composed of 5 to 65 parts by weight of a syrup consisting of 70 to 99 wt % of a mono-ethylenically unsaturated monomer containing an alkyl methacrylate having an alkyl group of 1 to 4 carbon atoms and 1 to 30 wt % of a (co)polymer composed of a mono-ethylenically unsaturated monomer unit containing an alkyl methacrylate having an alkyl group of 1 to 4 carbon atoms, and 35 to 95 parts by weight of bis(oxymethyl)tricyclo[$5.2.1.0^{2,6}$]decane dimethacrylate, to give a polymerizable mixture, and
    a step of polymerizing said polymerizable mixture to harden the mixture.

3. The method of producing an acrylic resin plate according to claim 1, wherein the mixture is a mixture composed of 30 to 65 wt % of a mono-ethylenically unsaturated monomer containing an alkyl methacrylate having an alkyl group of 1 to 4 carbon atoms and 35 to 70 wt % of a poly-functional (meth)acrylate having two or more (meth)acryloyl groups.

4. The method of producing an acrylic resin plate according to claim 2, wherein the mixture is a mixture composed of 30 to 65 parts by weight of a syrup consisting of 70 to 99 wt % of a mono-ethylenically unsaturated monomer containing an alkyl methacrylate having an alkyl group of 1 to 4 carbon atoms and 1 to 30 wt % of a (co)polymer composed of a mono-ethylenically unsaturated monomer unit containing an alkyl methacrylate having an alkyl group of 1 to 4 carbon atoms, and 35 to 70 parts by weight of a poly-functional (meth)acrylate having two or more (meth)acryloyl groups.

5. A method of producing an acrylic resin laminate, comprising a step of forming a transparent electrically conductive membrane on at least one surface of an acrylic resin plate obtained by the production method according to claim 1 or 2.

6. The method of producing an acrylic resin laminate according to claim 5, wherein the transparent electrically conductive membrane is an ITO membrane.

7. A method of producing a transparent electrode plate for touch panel, comprising a step of forming a transparent electrically conductive membrane on at least one surface of an acrylic resin plate obtained by the production method according to claim 1 or 2.

8. The method of producing a transparent electrode plate for touch panel according to claim 7, wherein the transparent electrically conductive membrane is an ITO membrane.

9. The method of producing a transparent electrode plate for touch panel according to claim 7, wherein the transparent electrode plate has a deflection temperature under load of 150° C. or more.

10. A method of producing a touch panel having an upper transparent electrode plate and a lower transparent electrode plate, wherein the upper transparent electrode plate and the lower transparent electrode plate are a transparent electrode plate having a transparent base plate and a transparent electrically conductive membrane formed on at least one surface of the transparent base plate and the upper transparent electrode plate and the lower transparent electrode plate are placed at an interval so that the transparent electrically conductive membranes face mutually, and
    at least one of the upper transparent electrode plate and the lower transparent electrode plate is a transparent electrode plate for touch panel obtained by the production method according to claim 6.

11. An acrylic resin plate made of a resin comprising 3 to 30 wt % of an alkyl methacrylate unit having an alkyl group of 8 to 20 carbon atoms, 2 to 35 wt % of a mono-ethylenically unsaturated monomer unit containing an alkyl methacrylate unit having an alkyl group of 1 to 4 carbon atoms, 35 to 95 wt % of bis(oxymethyl)tricyclo[$5.2.1.0^{2,6}$]decane dimethacrylate, and 0.015 to 0.2 parts by weight of terpenoid-based compounds and derivatives per 100 parts by weight of the resin.

12. A method of producing an acrylic resin plate, comprising polymerizing a polymerizable mixture comprising 3 to 30 wt % of an alkyl methacrylate having an alkyl group of 8 to 20 carbon atoms, 2 to 35 wt % of a mono-ethylenically unsaturated monomer containing an alkyl methacrylate having an alkyl group of 1 to 4 carbon atoms and 35 to 95 wt % of bis(oxymethyl)tricyclo[$5.2.1.0^{2,6}$]decane dimethacrylate to harden the mixture, and 0.015 to 0.2 parts by weight of terpenoid-based compounds and derivatives per 100 parts by weight of the mixture.

13. An acrylic resin laminate obtained by forming a transparent electrically conductive membrane on at least one surface of an acrylic resin plate according to claim 11.

14. The acrylic resin laminate according to claim 13, wherein the transparent electrically conductive membrane is an ITO membrane.

15. A transparent electrode plate for touch panel having an acrylic resin laminate according to claim 13.

16. The transparent electrode plate for touch panel according to claim 15, wherein the deflection temperature under load thereof is 150° C. or more.

17. A touch panel having an upper transparent electrode plate and a lower transparent electrode plate, wherein the upper transparent electrode plate and the lower transparent electrode plate are a transparent electrode plate having a transparent base plate and a transparent electrically conductive membrane formed on at least one surface of the transparent base plate and the upper transparent electrode and the lower transparent electrode plate are placed at an interval so that the transparent electrically conductive membranes face mutually, and at least one of the upper transparent electrode plate and the lower transparent electrode plate is a transparent electrode plate for touch panel according to claim 15.

* * * * *